(12) United States Patent
Hoppe

(10) Patent No.: US 6,587,104 B1
(45) Date of Patent: Jul. 1, 2003

(54) PROGRESSIVE HULLS

(75) Inventor: Hugues H. Hoppe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/409,529

(22) Filed: Sep. 30, 1999

(51) Int. Cl.$^7$ .............................................. G06T 15/00

(52) U.S. Cl. ...................................... 345/423; 345/441

(58) Field of Search ............................... 345/418, 419, 345/428, 420, 424, 441, 423; 382/125, 126

(56) References Cited

U.S. PATENT DOCUMENTS

| | | | | |
|---|---|---|---|---|
| 5,929,860 A | * | 7/1999 | Hoppe | 345/419 |
| 6,262,737 B1 | * | 7/2001 | Li et al. | 345/419 |
| 6,396,490 B1 | * | 5/2002 | Gorman | 345/419 |
| 6,414,683 B1 | * | 7/2002 | Gueziec | 345/428 |

OTHER PUBLICATIONS

Hoppe et al., *Mesh Optimization*, Computer Graphics (SIGGRAPH '93 Proceedings) (1993), 19–26.
Garland and Heckbert, *Surface Simplification Using Quadric Error Metrics*, Computer Graphics (SIGGRAPH '97 Proceedings) (1997), 209–216.
Hoppe, *Progressive Meshes*, Computer Graphics (SIGGRAPH '96 Proceedings) (1996), 99–108.
Popovic and Hoppe, *Progressive Simplicial Complexes*, Computer Graphics (SIGGRAPH '97 Proceedings) (1997), 217–224.
Garland and Heckbert, *Simplifying Surface with Color And Texture Using Quadric Error Metrics*, Visualization '98 Proceedings (1998), IEEE, 263–269.
Cohen, J., et al., *Simplifying Polygonal Models Using Successive Mappings*, Visualization '97 Proceedings (1997), IEEE, 395–402.
Gueziec, A., *Surface Simplification with Variable Tolerance*, Proceedings of the Second International Symposium on Medical Robotics and Computer Assisted Surgery (Nov. 1995), 4 pages (double sided).
Lindstrom, P., et al., *Fast and Memory Efficient Polygonal Simplification*, Visualization '98 Proceedings (1998), IEEE, 279–286, and 544.
Bajaj, C., et al., *Error–Bounded Reduction of Triangle Meshes with Multivariate Data*, SPIE 2656 (1996), 34–45.
Cohen, J., et al., *Appearance–Preserving Simplification*, Computer Graphics (SIGGRAPH '98 Proceedings) (1998), 115–122.

(List continued on next page.)

*Primary Examiner*—Mark Zimmerman
*Assistant Examiner*—Huedung X. Cao
(74) *Attorney, Agent, or Firm*—Woodcock Washburn LLP

(57) ABSTRACT

A progressive hull sequence is provided that approximates the outer surface geometry of a three dimensional object to be rendered. The progressive hull sequence is an adaptation of the earlier progressive mesh representation developed for level-of-detail control and progressive transmission of geometry. The progressive hull representation of an object is a sequence of lower and lower resolution mesh geometries with the property that the volume within each successive lower resolution mesh contains the volume defined by the previous higher resolution mesh. This requirement is met by ensuring that, as each edge is collapsed, each new vertex generated by the collapse is placed in the convex volume defined by the intersection of the half spaces above the face planes touching the collapsed edge. In addition, to ensure that the hull representation is as accurate as possible as edges are collapsed, it is desirable to minimize the increase in volume from hull to hull in the sequence of progressive hulls. A volume minimization constraint identifies a single point from this convex volume.

20 Claims, 5 Drawing Sheets

OTHER PUBLICATIONS

Gu, X., et al., *Silhouette Mapping*, Technical Report TR-1-99, Department of Computer Science, Harvard University, Mar. 1999, 14 pages.

Law, F., et al., *Preprocessing Occlusion for Real–Time Selective Refinement*, ACM Symposium on Interactive 3D Graphics (1999), 47–53 and 221.

* cited by examiner

PROGRESSIVE HULLS

FIELD OF THE INVENTION

This invention relates generally to geometric modeling using polygonal meshes for computer graphics, and more particularly to a progressive hulls data structure for modeling the outer surface geometry of a three-dimensional object in varying degrees of resolution, with the property that each lower resolution hull encompasses the higher resolution hull(s) from which it was derived.

BACKGROUND OF THE INVENTION

In a computer graphics system, it is desirable to represent an object as efficiently as possible to preserve memory and system bandwidth, and to enhance rendering speed. Computer graphics, such as in computer generated images, animations and effects for motion pictures, television, computer multi-media, computer games, print and other media, often employ detailed geometric models for rendering images of three-dimensional (3D) objects. These models are typically created using commercially available computer-aided modeling and 3D scanning systems. Although some geometric models may be initially defined using high level primitives, for efficient rendering they are typically converted to their lowest common denominator form, polygonal approximations called meshes.

In the simplest case, a mesh consists of a set of vertices and a set of faces. Each vertex specifies the (x,y,z) coordinates of a point in space, and each face defines a polygon by connecting together an ordered subset of the vertices. These conjoined polygons approximate the surface geometry of the modeled object. The polygons may in general have arbitrary numbers of vertices (and even holes). For convenience, the special case of a mesh (called a "triangle mesh") in which all faces have exactly three vertices is commonly used. Arbitrary meshes composed of polygons having faces with any number of vertices equal to or greater than three can be easily converted to triangle meshes through known triangulation processes.

In the following discussion, the geometry of a triangle mesh is denoted by a tuple (K, V), where K is a simplicial complex specifying the connectivity of the mesh simplices (i.e., the adjacency of the vertices, edges, and faces), and $V=\{v_1, \ldots, v_m\}$ is the set of vertex positions $v_j=(x_j,y_j,z_j)$ defining the shape of the mesh in $R^3$. More precisely, a parametric domain, $|K| \subset R^m$, is constructed by identifying each vertex of K with a canonical basis vector of $R^m$, and the mesh is defined as the image, $\phi_v(|K|)$, where $\phi_v:R^m \to R^3$ is a linear map. (See, e.g., H. Hoppe et al., *Mesh Optimization*, 1993 Computer Graphics Proceedings 19–26; hereinafter referred to as Hoppe93.) An exemplary mesh 80 is shown in FIG. 2. The vertices of a triangle mesh (e.g., vertices 82–89 of the mesh 80) are denoted as $v_1, \ldots, v_m$; the edges (e.g., 92–95) are denoted by pairs of adjacent vertices as $e=\{v_j, v_k\}$; and the faces (e.g., faces 100–107) are denoted by triples of interconnected vertices as $f=\{v_j,v_k,v_l\}$.

Complex (i.e., highly detailed) triangle meshes are notoriously difficult to render, store, and transmit. The meshes created by modeling and scanning systems are typically not optimized for display performance. In most applications, these initial meshes can usually be replaced by nearly indistinguishable approximations with far fewer faces, thereby improving rendering efficiency. One approach to speed up rendering is to replace a complex mesh by a set of level-of-detail (LOD) approximations. A detailed mesh is used when the object is close to the viewer, and coarser approximations (i.e., meshes with fewer vertices and faces) are substituted as the object recedes from the viewer in the image. These LOD approximations can be precomputed automatically using known mesh simplification methods. Thus, a fully detailed mesh is used when the object is close; and coarser approximations are substituted as the object recedes. Instantaneous switching between two LOD approximations of a given model can lead to a perceptible "popping" display effect. For this reason, the capability of constructing smooth visual transitions, called geomorphs, between meshes having different levels of detail is desirable.

A model should be stored in the smallest amount of memory or disk space. Two schemes have been developed to deal with this problem. One is to use mesh simplification, as described earlier, to reduce the number of faces in the model as much as possible while preserving its appearance. The other is mesh compression: minimizing the space taken to store the model, given that a particular mesh has been selected.

Co-pending application titled Progressive Meshes, U.S. patent application Ser. No. 08/586,953, filed Jan. 11, 1996, commonly assigned and incorporated herein by reference hereinafter referred to as Hoppe '953), describes a progressive mesh (PM) representation which provides a unified solution to the problems of efficiently storing, transmitting and rendering a mesh of arbitrary complexity. In short, the PM representation of an arbitrary mesh $\underline{M}$ is stored as a coarse or base mesh $M^0$ together with a sequence of n refinement records that indicate how to incrementally refine $M^0$ back up to the arbitrary mesh $\underline{M}$. Each refinement record encodes information associated with a vertex split transformation that transforms the mesh by splitting a vertex $v_s$ (positioned between side vertices $v_l$ and $v_r$, as shown, for example, in FIG. 2) to add one vertex $v_t$ and up to two faces ($f_l=\{v_s,v_t,v_l\}$ and ($f_r=\{v_s,v_t,v_r\}$) to the mesh. The PM representation thus defines a continuous sequence of LOD approximations to the arbitrary mesh that are produced by applying the vertex split transformation defined by successive refinement records successively to the base mesh $M^0$, resulting in a sequence of progressively more detailed meshes $M^0 \ldots M^n, M^n=\underline{M}$. In other words, the PM representation of $\underline{M}$ thus defines a continuous sequence of meshes $M^0, M^1, \ldots, M^n$ of increasing accuracy from which LOD approximations with a desired complexity can be efficiently retrieved.

FIG. 2 shows the vertex split transformation and its inverse, the edge collapse transformation. As shown in FIG. 2, each edge collapse transformation unifies two adjacent vertices into one, thereby removing two faces from the mesh. For the purpose of level-of-detail control, edge collapses are selected so as to best preserve the appearance of the mesh during simplification. Several appearance metrics have been developed and are described in, for example, Cohen et al., *Appearance-Preserving Simplification*, Computer Graphics (SIGGRAPH '98 Proceedings) (1998), 115–122, Garland and Heckbert, *Surface Simplification Using Quadric Error Metrics*, Computer Graphics (SIGGRAPH '97 Proceedings) (1997), 209–216, and Hoppe, *Progressive Meshes*, Computer Graphics (SIGGRAPH '96 Proceedings) (1996), 99–108.

The PM representation also supports smooth visual transitions, or geomorphs, between any two of these approximations, as well as allowing progressive transmission and efficient compression of the sequence of LOD approximations of the arbitrary mesh. In addition, the PM representation naturally supports progressive transmission, offers a concise encoding of M itself, and supports efficient selective refinement. In short, the PM representation offers an efficient, lossless, continuous-resolution representation. Thus, when rendering an image of a three-dimensional object, it is possible to reduce the amount of data needed to represent the geometry of the object without sacrificing much in terms of the quality of the resulting image, by using a simplified mesh created by collapsing selected edges of a higher resolution mesh.

For realistic rendering of an object, meshes in computer graphics (including the continuous sequence of LOD meshes defined by the PM representation) often have numerous other appearance attributes in addition to their geometric properties (i.e., vertex positions and connectivity of vertices and polygons). These additional appearance attributes can be classified into two types, discrete attributes and scalar attributes.

There are applications involving computer graphics in which it is necessary or desirable to provide a low resolution mesh representation of an object with the property that the volume defined by the low resolution mesh is larger than and contains the volume defined by a higher resolution, more detailed representation of the object. Such applications include silhouette clipping and collision detection. The PM technique does not necessarily meet this need since the progressive meshes do not necessarily enclose a volume that is larger than the original geometry.

SUMMARY OF THE INVENTION

The present invention provides computer based methods and systems for generating a sequence of data structures, or progressive hulls, that model the outer surface geometry of a three-dimensional object to be rendered. According to the invention, a first mesh representation of the object is formed, and then second mesh representation of the object is then formed. Importantly, the second mesh comprises a fewer number of vertices than the first mesh (i.e., is less detailed than the first mesh), and encloses a volume that contains the volume defined by the first mesh. These mesh representations of the three-dimensional object, referred to as hulls, represent the external visible apparent contour of the object, just as a silhouette represents the external contour of a two-dimensional object.

The second mesh representation of the object may be generated by performing an edge collapse transformation involving a reduction of two vertices into a single new vertex. Preferably, the edge collapse transformation comprises determining a set of permissible positions for the new vertex, selecting one of the permissible positions based on a minimization constraint, and collapsing the edge using the selected position for the new vertex.

The edge to be collapsed will typically be touched by a plurality of face planes. The set of permissible positions for the new vertex may be based on the constraint that, as the edge is collapsed, the new vertex generated by the collapse is placed in a volume defined by the intersection of the half spaces above the face planes touching the edge.

The minimization constraint mentioned above seeks to minimize the difference in volume between the second mesh and the first mesh.

Additional features and advantages of the invention will be made apparent from the following detailed description of an illustrated embodiment.

DETAILED DESCRIPTION OF THE ILLUSTRATED EMBODIMENTS

Overview of the Invention

The present invention provides methods and systems for generating a sequence of progressive hulls that approximate the outer surface geometry of a three dimensional object to be rendered. The progressive hull ("PH") sequence is an adaptation of the earlier progressive mesh representation developed for level-of-detail control and progressive transmission of geometry.

The methods and apparatus for storing and rendering views of an arbitrary polygonal mesh M use a PH format that represents the arbitrary polygonal mesh as a much coarser mesh $M^0$ together with a sequence of n detail records that indicate how to incrementally refine $M^0$ exactly back into the original mesh $M=M^n$. In an illustrated embodiment of the invention, each of these records stores information associated with a vertex split, an elementary mesh transformation that adds an additional vertex to the mesh. The PH representation of M thus defines a continuous sequence of meshes $M^0, M^1, \ldots, M^n$ of increasing accuracy from which level-of-detail approximations with any desired complexity can be efficiently retrieved.

The progressive hull representation of an object is a sequence of lower and lower resolution mesh geometries with the property that the volume within each successive lower resolution mesh contains the volume defined by the previous higher resolution mesh. This requirement is met by ensuring that, as each edge is collapsed, each new vertex generated by the collapse is placed in the volume defined by the intersection of the half spaces above the face planes touching the collapsed edge. In addition, to ensure that the hull representation is as accurate as possible as edges are collapsed, it is desirable to minimize the increase in volume from hull to hull in the sequence of progressive hulls. These two conditions result in a convex volume in which each new vertex may be placed. A volume minimization constraint identifies a single point from this volume. It is only in degenerate cases (in which the volume minimization constraint exactly matches an edge or face of the convex volume) that the solution for the vertex placement is not unique.

The present invention can be used to construct either an outer hull sequence or an inner hull sequence.

One exemplary application of this invention is in a computer graphics system employing silhouette clipping to combine a high resolution silhouette with a lower resolution mesh representation of an object. In order to perform silhouette clipping on an approximate geometry, or hull, it is desirable to use a hull that encloses a volume that is larger than the original, more detailed hull representation of the geometry. The progressive hull representation of the present invention meets this need. The invention creates a sequence of approximating hulls with the property that each coarser hull encloses the finer hulls.

Exemplary Operating Environment

Figure 1:
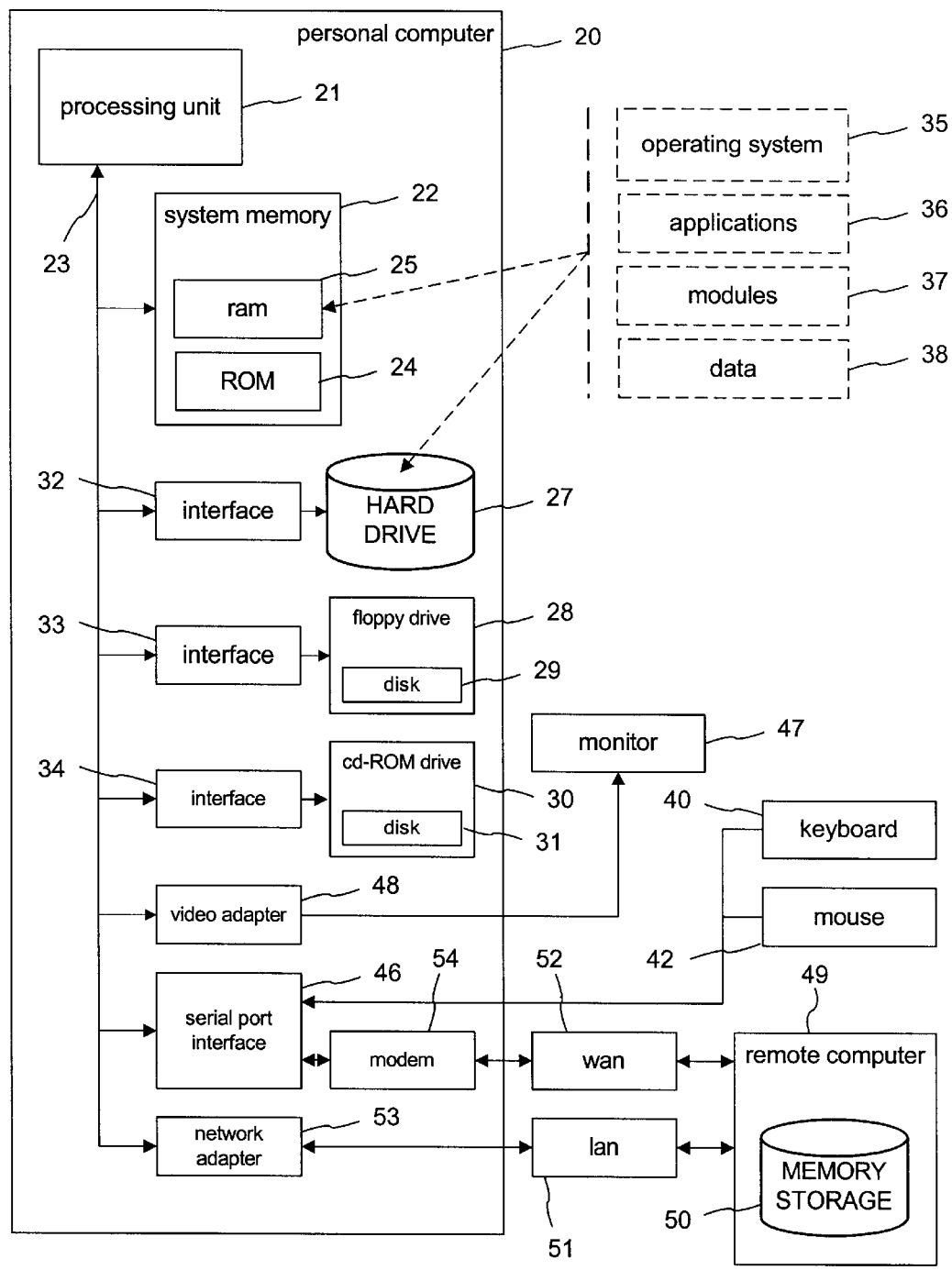
FIG. 1 is a block diagram of a computer system that can be used to implement a method and apparatus embodying the invention.

FIG. 1 and the following discussion are intended to provide a brief, general description of a suitable computing environment in which the invention may be implemented. While the invention will be described in the general context of computer-executable instructions of a computer program that runs on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The illustrated embodiment of the invention also is practiced in distributed computing environments where tasks are performed by remote processing devices that are linked through a communications network. However, some embodiments of the invention can be practiced on standalone computers. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples various system components including the system memory to the processing unit 21. The processing unit may be any of various commercially available processors. Dual microprocessors and other multiprocessor architectures also can be used as the processing unit 21.

The system bus may be any of several types of bus structure including a memory bus or memory controller, a peripheral bus, and a local bus using any of a variety of conventional bus architectures. The system memory includes read only memory (ROM) 24 and random access memory (RAM) 25. A basic input/output system (BIOS), containing the basic routines that help to transfer information between elements within the personal computer 20, such as during start-up, is stored in ROM 24.

The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the personal computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the personal computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Description of Progressive Hulls

Overview of Meshes

The computer system of FIG. 1 utilizes a progressive hull ("PH") representation to model three dimensional objects for graphics imaging as polygonal meshes at varying levels of detail. For simplicity, the PH representation in the illustrated embodiment operates on triangle meshes, such as those shown in FIG. 2. The PH representation can operate with more general meshes, such as those containing n-sided faces and faces with holes, by first converting the more general mesh into a triangle mesh using conventional triangulation processes (e.g., edges are added to subdivide polygonal faces of the mesh having more than three sides into triangle faces). Alternatively, edge collapse transformations (described below) can be applied to the sides of polygonal faces having more than three sides to produce a triangle mesh. It should also be recognized that the PH representation can be generalized in alternative embodiments of the invention to operate directly with more general meshes (i.e., without prior triangulation), at the expense of more complex data structures.

Overview of Progressive Mesh Representation

The progressive hull technique of the present invention is an adaptation of the progressive mesh technique described in H. Hoppe et al., *Mesh Optimization*, 1993 Computer Graphics Proceedings 19–26 (Hoppe93) and further described in co-pending application titled Progressive Meshes, U.S. patent application Ser. No. 08/586,953, filed Jan. 11, 1996, incorporated herein by reference (Hoppe '953). Hoppe93 demonstrates the use of the PM optimization method as a mesh simplification tool. Given an initial mesh $\underline{M}$ to approximate, a dense set of points is sampled both at the vertices of $\underline{M}$ and randomly over its faces. The optimization method is then invoked with initial mesh $\underline{M}$ as the starting mesh. By varying a setting of a representation constant, the optimization method takes different paths through a space of possible meshes and thereby produces optimized meshes with different levels of accuracy and conciseness.

Figure 2:
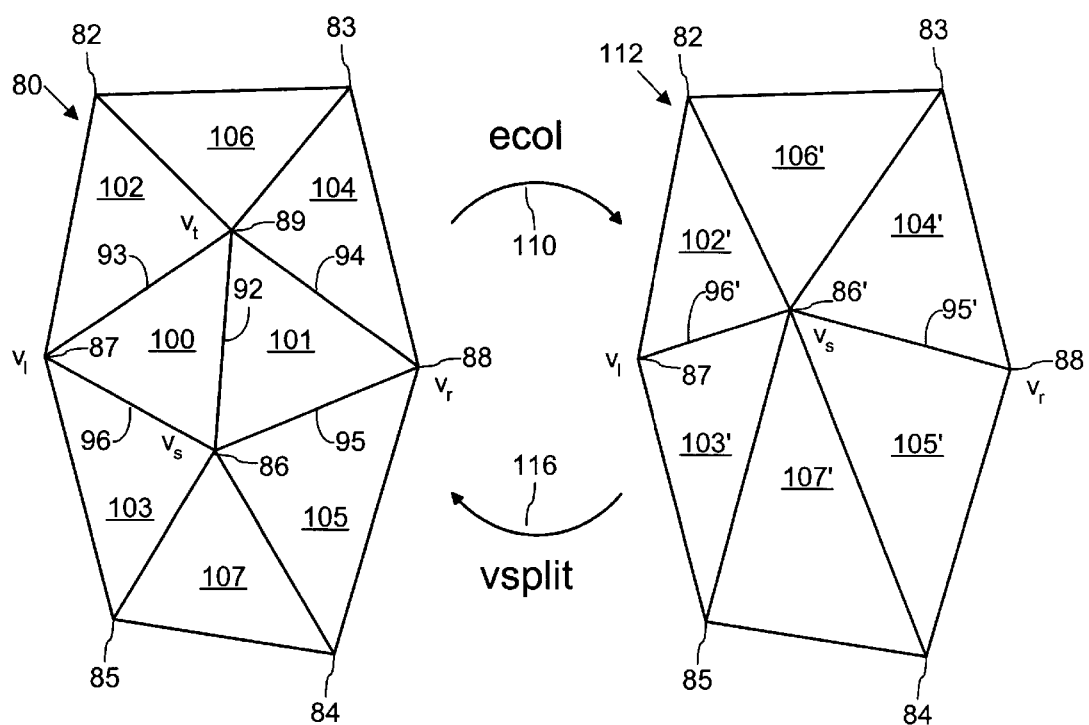
FIG. 2 is a block diagram of portions of example initial and resulting triangle meshes illustrating two inverse mesh transformations, an edge collapse operation, and a vertex split operation in accordance with the present invention.

With reference to FIG. 2, the present inventor has discovered that a single one of those transformations, edge collapse denoted herein as $\mathrm{ecol}(\{v_s, v_t\})$, is sufficient for the effective simplification of a mesh. To illustrate, an edge collapse transformation 110 unifies two adjacent vertices $v_s$ 86 and $v_t$ 89 of the mesh 80 into a single vertex $v_s$ 86' to form a resulting simpler mesh 112. The vertex $v_t$ 89 and the two adjacent faces $\{v_s, v_t, v_l\}$ 100 and $\{v_s, v_t, v_r\}$ 101 of the original mesh 80 vanish in the process. A position $v_s$ is specified for the new unified vertex 86'.

Thus, an initial mesh $\underline{M} = M^n$ can be simplified (such as by the mesh simplification method described more fully below) into a coarser mesh $M^0$ by applying a sequence of n successive edge collapse transformations:

$$(\underline{M}=M^n) \mathrm{ecol}_{n-1} \to M^{n-1} \ldots \mathrm{ecol}_1 \to M^1 \mathrm{ecol}_0 \to M^0$$

The particular sequence of edge collapse transformations must be chosen carefully, since it determines the quality of the approximating meshes $M^i$, $i<n$. Where $m_0$ is the number of vertices in $M^0$, the vertices of mesh $M^i$ are labeled herein as $V^i = \{v_1, \ldots v_{m0+i}\}$, so that vertex $v_{m0+i+1}$ removed by $\mathrm{ecol}_i$. As vertices may have different positions in the different meshes, the position of $v_j$ in $M^i$ is denoted herein as $v_j^i$.

A key observation is that an edge collapse transformation is invertible. The inverse transformation is herein referred to as a vertex split 116. A vertex split transformation, denoted herein as $\mathrm{vsplit}(v_s, v_l, v_r, v_t, A)$, adds near vertex $v_s$ 86' a new vertex (i.e., previously removed vertex $v_t$ 89) and two new faces (i.e., previously removed faces $\{v_s, v_t, v_l\}$ 100 and $\{v_s, v_t, v_r\}$ 101) according to the two side vertices $v_l$ 87 and $v_r$ 88. (If the edge $\{v_s, v_t\}$ 92 is a boundary edge, then $v_r=0$ and only one face is added.) The transformation also updates the attributes of the mesh in the neighborhood of the transformation. This attribute information, denoted by A, includes the positions $v_s$ and $v_t$ of the two affected vertices, the discrete attributes $d_{\{vs,vt,vl\}}$ and $d_{\{vs,vt,vr\}}$ of the two new faces, and the scalar attributes of the affected corners ($s_{(vs,\cdot)}$, $s_{(vt,\cdot)}$, $s_{(vl,\{vs,vt,vl\})}$, and $s_{(vr,\{vs,vt,vr\})}$).

Figure 3:
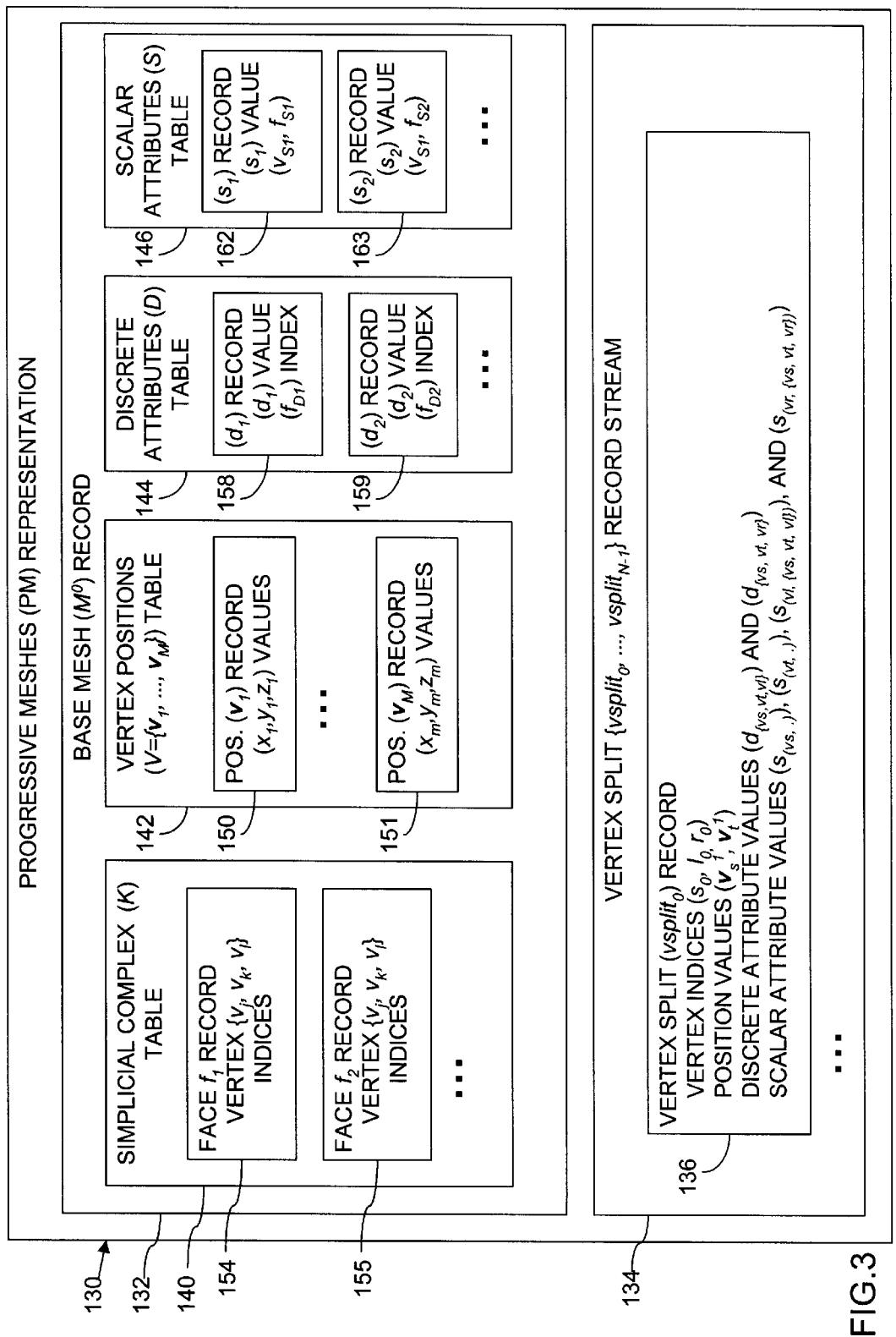
FIG. 3 is a block diagram of a PM representation data structure for representing a succession of level-of-detail approximations of an arbitrary original mesh M according to Hoppe '953.

Referring to FIG. 3, which is described in Hoppe '953, because edge collapse transformations are invertible, an arbitrary triangle mesh $\underline{M}$ therefore can be represented according to the illustrated embodiment of the invention as a data structure 130 containing a base mesh record 132 specifying the simple mesh $M^0$ (hereafter the "base mesh"), together with a sequence 134 of n vsplit records 136 specifying a sequence of vertex split transformations that reconstruct the arbitrary mesh $\underline{M}$ from the base mesh $M^0$:

$$M^0\, \mathrm{vsplit}_0 \to M^1\, \mathrm{vsplit}_1 \ldots \mathrm{vsplit}_{n-1} \to (M^n = \underline{M})$$

where the vsplit records are parameterized as $\mathrm{vsplit}_i(s_i, l_i, r_i, A_i)$. The data structure $(M^0, \{\mathrm{vsplit}_0, \ldots, \mathrm{vsplit}_{n-1}\})$ 130 is referred to herein as a progressive mesh ("PM") representation of the arbitrary mesh $\underline{M}$.

A significant property (referred to herein as "completeness") of the vertex split transformation is that a mesh with any arbitrary simplicial complex $K^A$ can be constructed from is a mesh with a minimal simplicial complex $K^M$ of the same topological type by a sequence of one or more of the transformations. Because the vertex split transformation is complete in this sense, any arbitrary mesh can be substantially exactly represented using the illustrated PM representation. Similarly, a set of one or more mesh transformations also is complete if a mesh having any arbitrary simplicial complex $K^A$ can be constructed from a minimal simplicial complex $K^M$ of the same topological type by a sequence of transformations from the set. Accordingly, although vertex split transformations are specified in the sequence of records in the PM representation of the illustrated embodiment, the records in a PM representation can alternatively specify a set of mesh transformations that is complete other than the vertex split transformation.

In the PM representation 130 of the illustrated embodiment, the base mesh record 132 comprises a simplicial complex table 140, a vertex positions table 142, a discrete attributes table 144, and a scalar attributes table 146 which contain information of the tuple $M^0 = (K^0, V^0, D^0, S^0)$ that defines the base mesh $M^0$. The vertex positions table 142 contains $m_0$ o position records 150–151 for each vertex of the base mesh $M^0$ with that vertex's coordinate values (x,y,z). In the illustrated vertex positions table 142, the position records 150–151 are indexed according to vertex indices associated with the indices of the base mesh $M^0$.

The simplicial complex table 140 contains face records 154–155 for each face in the base mesh $M^0$ with the indices of that face's vertices $\{v_j, v_k, v_l\}$. This vertex information in the face records explicitly defines each face of the base mesh $M^0$, and also implicitly defines the edges and corners of the base mesh $M^0$. In alternative embodiments, the base mesh record 132 can contain information which explicitly defines the edges and corners, such as records containing indices of pairs of adjacent vertices to define the edges and records containing indices of vertex index, face index tuples to define the corners. In the illustrated simplicial complex table, the face records 154–155 are indexed according to face indices associated with the faces of the base mesh $M^0$.

The discrete attributes table 144 contains records 158–159 with information (i.e., an attribute value and a face index) that defines the discrete attributes associated with the faces of the base mesh $M^0$. The scalar attributes table 146 contains records 162–164 with information (i.e., an attribute value and a vertex index, face index tuple) that define scalar attributes associated with corners of the base mesh $M^0$. Although illustrated with a single discrete attributes table 144 and a single scalar attributes table 146, the base mesh record 132 can contain separate attributes tables for each of multiple different discrete and scalar attributes (e.g., material identifies, shader function parameters, diffuse color, normal, texture coordinates, etc.) of the base mesh $M^0$.

The vertex split records 136 in the sequence 134 specify vertex split transformations that reconstruct the arbitrary original mesh $\underline{M}$ from the base mesh $M^0$. In general, the information in each of the vertex split records comprises indices of the vertices $v_s$, 86, $v_l$ 87 and $v_r$ 88 (FIG. 2); the position coordinates $v_s''$ and $v_t''$ of the vertices $v_s$ 86 and $v_t$ 89 (FIG. 2); the discrete attributes $d_{\{vs,vt,vl\}}$ and $d_{\{vs,vt,vr\}}$ of faces 100 and 101 (FIG. 2); and the scalar attributes $s_{(vs,\cdot)}$, $s_{(vt,\cdot)}$, $s_{(vl,\{vs,vt,vl\})}$, and $s_{(vr,\{vs,vt,vr\})}$ of the corners of the faces 100 and 101. In alternative embodiments, the vertex split records can specify the vertices $v_s$, $v_l$, and $v_r$ indirectly, such as by the index of a neighboring face (e.g., one including the vertices $v_s$ and $v_l$) and bits identifying the vertexes from those adjacent that face (e.g., identifying $v_s$ and $v_l$ out, of the face's vertices, and identifying $v_r$ out of the vertices neighboring the face).

Construction of Progressive Hulls

The progressive hull sequence is an adaptation of progressive mesh representation developed for level-of-detail control and progressive transmission of geometry and described above and in Hoppe '953.

To reiterate, the PM representation of a mesh $M^n$ is obtained by simplifying the mesh through a sequence of edge collapse transformations, and recording their inverses. Specifically, the PM representation consists of a coarse base mesh $M^0$ and a sequence of n vertex split transformations that progressively recover detail. Thus, the representation captures a continuous family of approximating meshes $M^0 \ldots M^n$. In accordance with the present invention, proper constraints on the selection of edge collapse transformations allow the creation of PM sequences that are progressive hulls.

Figure 4:
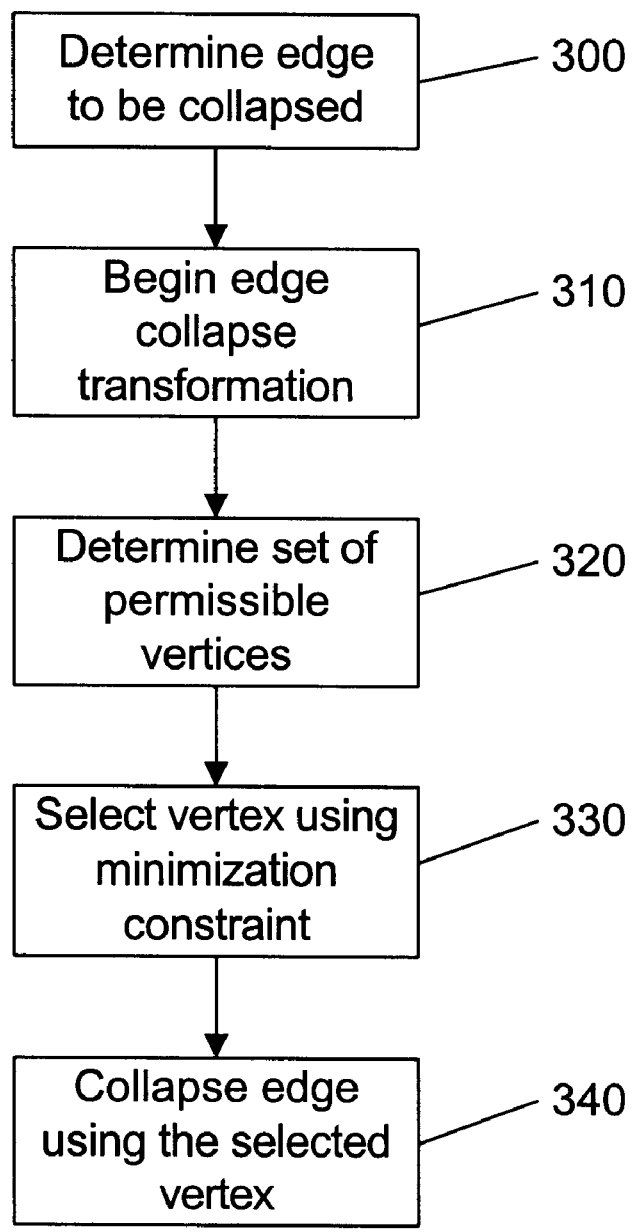
FIG. 4 is a flow diagram of an exemplary method of constructing progressive hulls in accordance with the present invention.
Figures 5, 6:
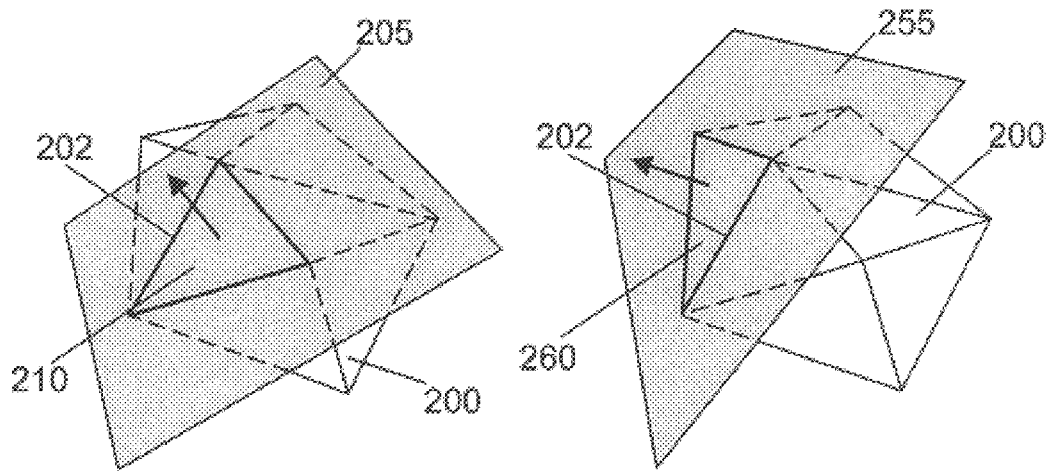
FIGS. 5 and 6 are diagrams showing two respective half spaces above associated face planes in accordance with the present invention.

In accordance with the rendering of the present invention, for an arbitrary triangle mesh $M^n$, a set of one or more coarser approximating meshes that completely enclose $M^n$ is determined as described with respect to FIG. 4. At step 300, an edge to be collapsed is determined using techniques described in Hoppe '953, for example. The edge collapse transformation is initiated at step 310. First, a new vertex is selected such that the new volume preferably contains the earlier mesh. Accordingly, at step 320, a set of permissible vertices is determined. The set of permissible vertices desirably contains those vertices that are placed in the volume defined by the intersection of the half spaces above the face planes touching the collapsed edge. FIGS. 5 and 6 are diagrams showing two respective half spaces 205, 255 above associated face planes 210, 260 of an exemplary mesh 200. The intersection of the two half spaces 205, 255 above the face planes 210, 260 define an exemplary volume in which a set of permissible vertices is contained when the edge 202 common to the two face planes 210, 260 is collapsed.

At step 330, a single point in the volume that should be the new vertex is identified by minimizing the increase in volume between the new hull and the previous hull as a volume minimization constraint. Using the new vertex, the edge is collapsed at step 340. The process is repeated for each edge collapse. After each edge collapse, a new progressive hull is formed.

Thus, a continuous family of nested approximating meshes $M^0 \ldots M^n$ is constructed from $M^n$ such that $V(M^0) \supset V(M^1) \ldots \supset V(M^n)$, where $V(M)$ denotes the interior volume of M. $\{M^0 \ldots M^n\}$ is referred to as a progressive hull sequence for $M^n$. For the PM sequence to be a progressive hull, each edge collapse transformation $M^{i+1} \to M^i$ preferably satisfies the property $V(M^i) \supset V(M^{i+1})$. In other words, the volume of the new hull contains the volume of the prior hull.

Definition of Interior Volume

The given mesh $M^n$ is assumed to be orientable and closed (i.e., it has no boundaries). The mesh may have several connected components, and may contain interior cavities (e.g. a hollowed sphere). In most cases, it is relatively clear which points lie in the interior volume $V(M)$. The definition of interior is less obvious in the presence of self-intersections, or when surfaces are nested (e.g., concentric spheres). Interfaces for 2D rasterization often allow several rules to define the interior of non-simple polygons as described in Adobe Systems Inc., *Postscript Language Reference Manual*, second ed., Addison Wesley (1990) and Microsoft Corp., *Programming Windows*, fifth ed., Microsoft Press (1998). These rules generalize to the case of meshes in 3D, as described below.

To determine if a point $p \in R^3$ lies in the interior of a mesh M, a ray from p off to infinity is selected, and all intersections of the ray with M are determined. Assume without loss of generality that the ray intersects the mesh only within interiors of faces (i.e., not on any edges). Each intersection point is assigned a number, +1 or −1, equal to the sign of the dot product between the ray direction and the normal of the intersected face. Let the winding number $w_M(p)$ be the sum of these numbers. Because the mesh is closed, it can be shown that $w_M(p)$ is independent of the chosen ray.

Based on $w_M(p)$, several definitions of interior volume are possible. The non-zero winding rule defines p to be interior if and only if $w_M(p)$ is odd. In the present invention, the positive winding rule is used which defines interior volume as $V(M) = \{p \in R^3 : w_M(p) > 0\}$.

As described above, each edge collapse transformation $M^{i+1} \to M^i$ preferably satisfies the property $V(M^i) \supset V(M^{i+1})$. A sufficient condition is to guarantee that, at all points in space, the winding number either remains constant or increases:

$$\notin p \in R^3, w_{Mi+1}(p) \geq w_{Mi}(p).$$

Intuitively, the surface must either remain unchanged or locally move "outwards" everywhere.

Let $F^i$ and $F^{i+1}$ denote the sets of faces in the neighborhood of the edge collapse as shown in FIG. 2, and let v be the position of the unified vertex in $M^i$. For each face $f \in F^{i+1}$, v is constrained to lie "outside" the plane containing face f. Note that the outside direction from a face is meaningful since the mesh is oriented. The resulting set of linear inequality constraints defines a feasible volume for the location of v. The feasible volume may be empty, in which case the edge collapse transformation is disallowed. The transformation is also disallowed if either $F^i$ or $F^{i+1}$ contain self-intersections. If v lies within the feasible volume, it can be shown that the faces $F^i$ cannot intersect any of the faces $F^{i+1}$. Therefore, $F^i \cup \text{flip}(F^{i+1})$ forms a simply connected, non-intersecting, closed mesh enclosing the difference volume between $M^i$ and $M^{i+1}$. The winding number $w(p)$ is increased by one within this difference volume and remains constant everywhere else. Therefore, $V(M^i) \supset V(M^{i+1})$.

The position v is found with a linear programming algorithm, using the above linear inequality constraints and the goal function of minimizing volume. Mesh volume, defined here as $f_{p\in R^3} w_M(p)dp$, is a linear function on v that involves the ring of vertices adjacent to v, as described, for example, in Gueziec, *Surface Simplification With Variable Tolerance*, Proceedings of the Second International Symposium on Medical Robotics and Computer Assisted Surgery (November 1995), 132–139, and Lindstrom and Turk, *Fast And Memory Efficient Polygonal Simplification*, Visualization '98 Proceedings (1998), IEEE, 279–286.

As in earlier simplification schemes, the candidate edge collapses are entered into a priority queue according to some cost metric. At each iteration, the edge with the lowest cost is collapsed, and the costs of affected edges are recomputed. Various cost metrics are possible. To obtain monotonically increasing bounds on the accuracy of the hull, one can track maximum errors as described in Bajaj and Schikore, *Error-Bounded Reduction Of Triangle Meshes With MultiVariate Data*, SPIE 2656 (1996), 34–45, and Cohen et al., *Simplifying Polygonal Models Using Successive Mappings*, Visualization '97 Proceedings (1997), IEEE, 81–88. Another choice is the quadric error metric described in Garland and Heckbert, *Surface Simplification Using Quadric Error Metrics*, Computer Graphics (SIGGRAPH '97 Proceedings) (1997), 209–216. In accordance with the present invention, it is preferred to minimize the increase in volume, which matches the goal function used in positioning the vertex.

Inner and Outer Hulls

The technique described so far constructs a progressive outer hull sequence $M^0 \supset \ldots \supset M^n$. By simply reversing the orientation of the initial mesh $M^n$, the same construction gives rise to a progressive inner hull sequence $\underline{M}^0 \subset \ldots \subset \underline{M}^n$. Combining these produces a single sequence of hulls $\underline{M}^0 \subset \ldots \subset \underline{M}^n \subset \ldots \subset M^0$ that bounds the mesh $M^n$ from both sides.

The surface geometry, scalar attributes, and discontinuity curves can be preserved as described in Hoppe '953. Similarly, the scalar attributes at vertices and at corners can be optimized as in Hoppe '953. Range constraints, normals, and changes to topology of discontinuity curves are also handled in accordance with Hopee'953.

Exemplary Application: Silhouette Mapping and Clipping

Recently, there has been a strong effort to develop image based rendering algorithms and techniques. These algorithms and techniques render new views starting from image-like input and representations. They can allow for faster rendering than from traditional model representations, and can also allow the creation of models using photographs as input, without requiring the lengthy process of geometric modeling.

Progressive hulls in accordance with the present invention can be used to accurately capture the external silhouette of a model in order to clip the approximate geometry, as described in Gu et al., *Silhouette Mapping*, Technical Report TR-1-99, Department of Computer Science, Harvard University, March 1999. Silhouettes are sampled from a discrete set of viewpoints about the object that are collected into a silhouette map. The silhouette from an arbitrary viewpoint is then computed as the interpolation from three nearby viewpoints in the silhouette map. Pairwise silhouette interpolation is based on a visual hull approximation in the epipolar plane. A three-stage approach (rectify pair, warp, unrectify) is used to perform silhouette interpolation. Three views are interpolated between using a series of two pairwise interpolations. A silhouette map stores only the silhouette contour information viewed from a 2D manifold (for example a sphere) of views.

The silhouette map itself is adaptively simplified by removing views whose silhouettes are accurately predicted by interpolation of their neighbors. The model geometry is approximated by a progressive hull construction in accordance with the present invention, and is rendered using projected texture maps. To guarantee that the geometry is at least as large as the silhouette, the progressive hulls technique of the present invention is used to construct a nested sequence of meshes, in which each coarser mesh completely encloses the original mesh is provided. The 3D rendering is clipped to the interpolated silhouette using stencil planes. In silhouette clipping, a low-resolution geometry is rendered and clipped to a more accurate silhouette.

Thus, during a preprocess, a silhouette map is formed by sampling the object silhouette from a discrete set of viewpoints. Interpolation of these silhouettes is made using a visual hull approximation of the model in a rectified epipolar setting. Storage of the silhouette map can be reduced through adaptive simplification.

Therefore, the systems and methods of the present invention can be used in a rendering system that ensures that objects are displayed with high resolution silhouettes, even when low resolution geometry is used to speed up rendering. Silhouette clipping is used to ensure that the low resolution geometry is only drawn in the screen region defined by a high resolution silhouette.

In addition to the silhouette mapping and clipping described above, it is contemplated that the progressive hull representation will also find useful applications in collision detection, particularly using a known selective refinement framework.

Moreover, it is contemplated that the progressive hull representation will find useful application in the construction of conservative approximations of occluder meshes for occlusion culling, such as that described in Law et al., *Preprocessing Occlusion For Real-Time Selective Refinement*, ACM Symposium on Interactive 3D Graphics (1999), 47–53. In a complicated geometric environment, some mesh objects close to the viewer may occlude more distant objects. To reduce the rendering computation, it is desirable to efficiently determine that the more distant object is completely occluded and therefore need not be rendered.

The time complexity of determining whether the closer mesh occludes the distant mesh is related to the complexity of the meshes. To reduce the time complexity, the closer mesh can be approximated by a coarser, progressive inner mesh approximation, and the distant mesh can be approximated by a coarser, progressive outer mesh approximation, in accordance with the present invention. The occlusion test is then applied between the closer inner hull and the distant outer hull. If it can be determined that the closer hull completely occludes the distant hull, then it follows that the closer mesh occludes the distant mesh. This is because the silhouette of the closer mesh has shrunk, and the silhouette of the distant mesh has grown, so if the closer mesh's silhouette still completely encloses the distant mesh's silhouette, then there is complete occlusion.

Conclusion

Having described and illustrated the principles of my invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of my invention may be applied, it should be recognized that the detailed embodiments are illustrative only and should not be taken as limiting the scope of my invention. Rather, I claim as my invention all such embodiments as may come within the scope and spirit of the following claims and equivalent thereto.

I claim:

1. A computer based method for generating a sequence of data structures that model the outer surface geometry of a three dimensional object to be rendered, comprising:

(a) generating a first mesh representation of the object, wherein the first mesh comprises a first number of vertices and encloses a first volume; and (b) generating a second mesh representation of the object, wherein the second mesh comprises a second number of vertices, the second number being less than the first number, and encloses a second volume that contains the first volume.

2. A method according to claim 1, wherein the second mesh representation of the object is generated by performing an edge collapse transformation involving a reduction of two vertices into a single new vertex.

3. A method according to claim 2, wherein the edge collapse transformation comprises:

determining a set of permissible positions for the new vertex;

selecting one of the permissible positions based on a minimization constraint; and collapsing the edge using the selected position for the new vertex.

4. A method according to claim 3, wherein the edge is touched by a plurality of face planes, and wherein the set of permissible positions for the new vertex is based on the constraint that, as the edge is collapsed, the new vertex generated by the collapse is placed in a volume defined by the intersection of the half spaces above the face planes touching the edge.

5. A method according to claim 3, wherein the minimization constraint comprises minimizing the increase in volume between the second volume and the first volume.

6. A method according to claim 1, further comprising performing a plurality of iterations of the steps (a) and (b) until the second mesh representation has a predetermined level-of-detail.

7. A method according to claim 1, further comprising:

choosing a level-of-detail; and performing a plurality of iterations of the steps (a) and (b) until the second mesh representation has the chosen level-of-detail.

8. A computer based system for generating a sequence of data structures that model the outer surface geometry of a three-dimensional object to be rendered, the system comprising:

a data store for storing data representative of the outer surface geometry of the three-dimensional object; and a processor for reading the data store, generating a first mesh representation of the object using the data representative of the outer surface geometry of the three dimensional object, wherein the first mesh comprises a first number of vertices and encloses a first volume, and generating a second mesh representation of the object, wherein the second mesh comprises a second number of vertices, the second number being less than the first number, and encloses a second volume that contains the first volume.

9. A system according to claim 8, wherein the processor generates the second mesh representation of the object by performing an edge collapse transformation involving a reduction of two vertices into a single new vertex.

10. A system according to claim 9, wherein the processor performs the edge collapse transformation by determining a set of permissible positions for the new vertex, selecting one of the permissible positions based on a minimization constraint, and collapsing the edge using the selected position for the new vertex.

11. A system according to claim 10, wherein the edge is touched by a plurality of face planes, and wherein the set of permissible positions for the new vertex is based on the constraint that, as the edge is collapsed, the new vertex generated by the collapse is placed in a volume defined by the intersection of the half spaces above the face planes touching the edge.

12. A system according to claim 10, wherein the processor minimizes the increase in volume between the second volume and the first volume as the minimization constraint.

13. A system according to claim 8, wherein the processor performs a plurality of iterations generating additional mesh representations of the object, each additional mesh representation having a volume enclosing the volume of the previous mesh representation, until one of the additional mesh representations has a predetermined level-of-detail.

14. A system according to claim 8, further comprising:

a user interface for choosing a level-of-detail, wherein the processor performs a plurality of iterations generating additional mesh representations of the object, each additional mesh representation having a volume enclosing the volume of the previous mesh representation, until the current additional mesh representation has the chosen level-of-detail.

15. A computer readable data storage medium having encoded thereon a progressive hulls representation of a multi-dimensional object for computer graphics, the progressive hulls representation comprising:

a base mesh record for specifying a base mesh representation of the object at a lowest level-of-detail and a highest volume; and a plurality of mesh records for specifying an associated plurality of mesh representations of the object at progressively higher levels-of-detail and at progressively lower volumes;

wherein each mesh encompasses the meshes having a higher resolution than itself.

16. A computer readable data storage medium according to claim 15, further comprising edge collapse transformation data indicative of reductions of vertices between successive mesh representations.

17. A computer readable medium having stored thereon a data structure, comprising:

a first data field containing base mesh data for specifying a base mesh representation of a multi-dimensional object for computer graphics at a lowest level-of-detail and a highest volume; and a plurality of data fields containing associated mesh data for specifying an associated plurality of mesh representations of the object at progressively higher levels of detail and at progressively lower volumes;

wherein each mesh encompasses the meshes having a higher resolution than itself.

18. A computer readable medium according to claim 17, further comprising a transformation data field containing edge collapse transformation data indicative of reductions of vertices between successive mesh representations.

19. A progressive hull data structure stored in a computer readable medium that approximates an outer surface geometry of a three-dimensional object to be rendered in a computer graphics system, wherein the progressive hull data structure comprises data defining a sequence of lower and lower resolution mesh geometries, each enclosing a volume, with the property that the volume within each successive lower resolution mesh contains the volume defined by the previous higher resolution mesh.

20. A progressive hull data structure as recited in claim 19, wherein each successive lower resolution mesh is distinguished from the previous higher resolution mesh by an edge collapse transformation and a new vertex generated by the edge collapse transformation, wherein-the new vertex is placed in a volume defined by an intersection of half spaces above face planes touching the collapsed edge.

\* \* \* \* \*